US008093771B2

(12) United States Patent
Liao et al.

(10) Patent No.: US 8,093,771 B2
(45) Date of Patent: Jan. 10, 2012

(54) POWER-GENERATING WHEEL HUB

(76) Inventors: Kuei-Tang Liao, Taichung Hsien (TW);
Hubert Chen, Taichung Hsien (TW)

( * ) Notice: Subject to any disclaimer, the term of this patent is extended or adjusted under 35 U.S.C. 154(b) by 239 days.

(21) Appl. No.: 12/592,741

(22) Filed: Dec. 1, 2009

(65) Prior Publication Data

US 2010/0320879 A1 Dec. 23, 2010

(30) Foreign Application Priority Data

Jun. 19, 2009 (TW) .............................. 98120612 A

(51) Int. Cl.
*H02K 7/18* (2006.01)

(52) U.S. Cl. ..................................... 310/67 A; 310/257

(58) Field of Classification Search ................ 310/67 A, 310/194, 179, 257, 263
See application file for complete search history.

(56) References Cited

U.S. PATENT DOCUMENTS

| | | | | |
|---|---|---|---|---|
| 5,828,145 A * | 10/1998 | Nakamura | ................. | 310/67 A |
| 6,133,669 A * | 10/2000 | Tupper | .......................... | 310/263 |
| 7,002,280 B2 * | 2/2006 | Endo | .............................. | 310/263 |
| 7,199,500 B2 * | 4/2007 | Yoshida | ........................ | 310/257 |
| 7,628,518 B2 * | 12/2009 | Fujii et al. | ..................... | 362/476 |
| 2004/0189112 A1 * | 9/2004 | Fujii et al. | ................... | 310/67 A |
| 2008/0129157 A1 * | 6/2008 | Nakano | ........................ | 310/67 A |

* cited by examiner

*Primary Examiner* — Thanh Lam
(74) *Attorney, Agent, or Firm* — Kilpatrick Townsend & Stockton LLP

(57) ABSTRACT

A power-generating wheel hub includes a hub shaft including a mounting section, and a bobbin including a tubular body sleeved around the mounting section, two flange plates connected respectively to two opposite ends of the tubular body, and a coil wound around the tubular body. Two magnetic yoke disks are sleeved on the mounting section adjacent respectively to outer faces of the flange plates, and each includes a plurality of angularly spaced-apart radial protrusions, and a plurality of indentations each formed between two adjacent ones of the radial protrusions. The indentations in the two magnetic yoke disks are staggered axially with respect to each other. Magnetic yoke claws respectively include radial arms inserted respectively into the indentations in the magnetic yoke disks and abutting against the outer faces of the flange plates, and axial arms extending axially from the respective radial arms and arranged annularly around the coil.

7 Claims, 5 Drawing Sheets

_US 8,093,771 B2_

POWER-GENERATING WHEEL HUB

CROSS-REFERENCE TO RELATED APPLICATION

This application claims priority to Taiwanese Application No. 098120612, filed Jun. 19, 2009, the disclosure of which is incorporated herein by reference.

BACKGROUND OF THE INVENTION

1. Field of the Invention

This invention relates to a bicycle wheel hub, more particularly to a power-generating wheel hub.

2. Description of the Related Art

A power-generating wheel hub, as disclosed in U.S. Pat. No. 7,002,280, includes a bobbin having a tubular body, two flange plates connected respectively to two opposite ends of the tubular body, a plurality of grooves formed in side surfaces of the flange plates, and a coil wound around the tubular body. A plurality of magnetic yoke arms are mounted to the bobbin such that they engage respectively the grooves. Since the grooved structures of the flange plates are adjacent to the winding area of the coil, the coil is easily hooked to the grooves during a winding operation, so that the winding operation of the coil is not smooth. Further, since the grooves in the flange plates determine the number of magnetic poles, and since the grooves are formed fixedly in the flange plates of the bobbin, the number of the magnetic poles is fixed. In order to suit an energy generation requirement, a new mold for the bobbin must be made so that the number of the poles can be increased or decreased according to the requirement. However, this increases the costs of the power-generating wheel hub.

SUMMARY OF THE INVENTION

Therefore, the object of the present invention is to provide a power-generating wheel hub that has a strong structure, that can permit a smooth winding operation of a coil, and that can provide flexible adjustment in the number of poles.

According to this invention, a power-generating wheel hub comprises a hub shaft including a mounting section, a bobbin, two magnetic yoke disks, a plurality of magnetic yoke claws, a casing, and a magnet unit. The bobbin includes a tubular body sleeved around the mounting section, two flange plates connected respectively to two opposite ends of the tubular body, and a coil wound around the tubular body between the flange plates. The bobbin is made of a magnetically conductive metal. Each flange plate has an inner face confronting the coil, an outer face opposite to the inner face, and an outer peripheral face interconnecting the inner and outer faces. The magnetic yoke disks are sleeved on the mounting section adjacent respectively to the outer faces of the flange plates. Each magnetic yoke disk includes a plurality of angularly spaced-apart radial protrusions, and a plurality of indentations each formed between two adjacent ones of the radial protrusions. The indentations in the two magnetic yoke disks are staggered axially with respect to each other. Each magnetic yoke claw includes a radial arm abutting against the outer face of one of the flange plates, and an axial arm extending axially from the radial arm. The radial arms of the magnetic yoke claws are inserted respectively into the indentations in the magnetic yoke disks. The axial arms of the magnetic yoke claws are arranged annularly around the coil. The casing is mounted rotatably to the hub shaft, and covers the bobbin, the magnetic yoke disks, and the magnetic yoke claws. The magnet unit includes a plurality of angularly spaced-apart magnets provided on an inner wall of the casing and facing the magnetic yoke claws.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
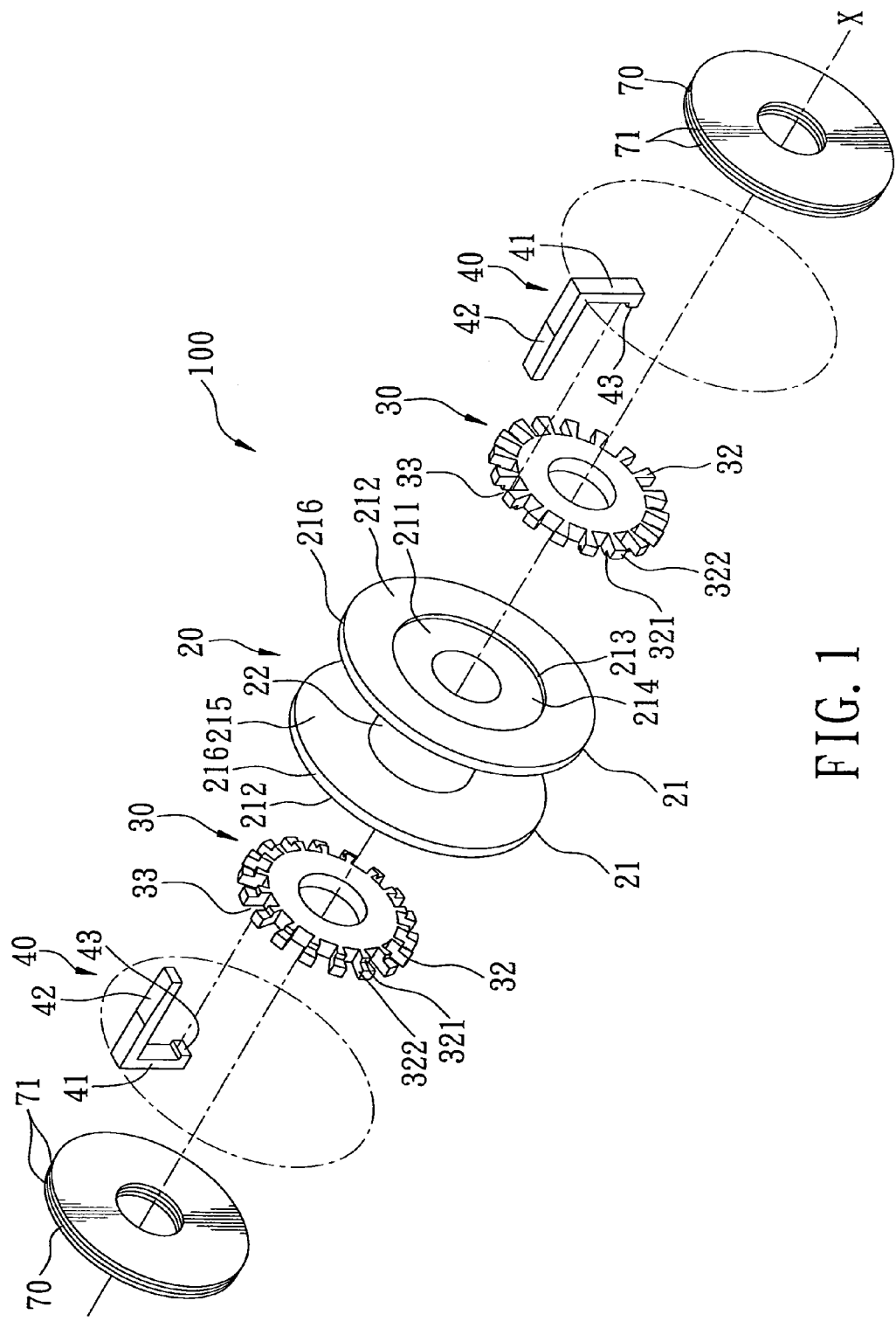
FIG. 1 is an exploded perspective view of a power-generating wheel hub according to the first preferred embodiment of this invention.

Before the present invention is described in greater detail, it should be noted that the same reference numerals have been used to denote like elements throughout the specification.

Figure 2:
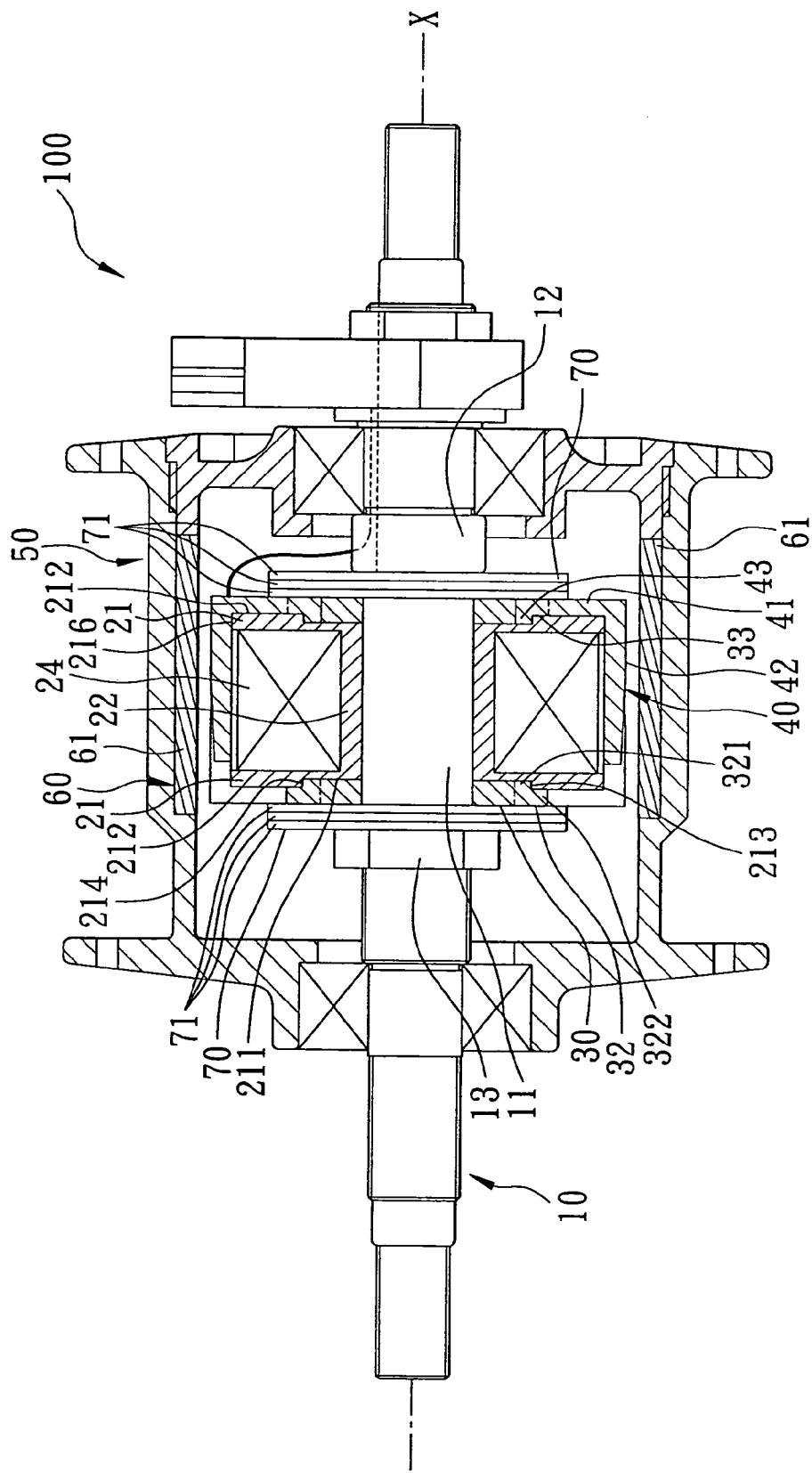
FIG. 2 is a sectional view of the first preferred embodiment in an assembled state.

Referring to FIGS. 1 and 2, a power-generating wheel hub 100 according to the first preferred embodiment of this invention is shown to comprise a hub shaft 10, a bobbin 20, two magnetic yoke disks 30, a plurality of magnetic yoke claws 40, a casing 50, a magnet unit 60, and two insulating plate sets 70.

The hub shaft 10 extends along an axial direction (X), and includes a mounting section 11, a retaining ring 12 disposed on one side of the mounting section 11, and a screw nut 13 connected threadedly to the other side of the mounting section 11 axially opposite to the retaining ring 12.

The bobbin 20 includes a tubular body 22 sleeved around the mounting section 11 between the retaining ring 12 and the screw nut 13, two flange plates 21 connected respectively to two opposite ends of the tubular body 22, and a coil 24 wound around the tubular body 22. The bobbin 20 is made of a magnetically conductive metal, so that it further functions as a magnetic core. Each flange plate 21 has an inner face 215 confronting the coil 24, an outer face 212 opposite to the inner face 215, an outer peripheral face 216 interconnecting the inner and outer faces 215, 212, and a mounting groove 214 formed in the outer face 212 and defined by a groove bottom wall 211 and an annular groove surrounding wall 213. The outer peripheral face 216 has a continuous circular shape.

The magnetic yoke disks 30 are sleeved on the mounting section 11, and are disposed respectively in the mounting grooves 214 in the flange plates 21. Each magnetic yoke disk 30 includes a plurality of angularly spaced-apart radial protrusions 32, and a plurality of indentations 33 each formed between two adjacent ones of the radial protrusions 32. Each radial protrusion 32 includes an inner radial part 321 extending into the mounting groove 214 of a corresponding flange plate 21 and abutting against the groove bottom wall 211 and the groove surrounding wall 213 thereof, an outer radial part 322 that extends outwardly from the mounting groove 214 of the corresponding flange plate 21, that abuts against the outer face 212 of the corresponding flange plate 21, and that is longer than the inner radial part 321. The indentations 33 of the magnetic yoke disks 30 are staggered axially with respect to each other.

Each of the magnetic yoke claws 40 includes a radial arm 41 abutting against the outer face 212 of the corresponding flange plate 21 outwardly of the mounting groove 214 thereof, and an axial arm 42 extending axially from one end of the radial arm 41 and abutting against the outer peripheral face 216 of the corresponding flange plate 21. The radial arms 41 of the magnetic yoke claws 40 are inserted respectively into the indentations 33 in the magnetic yoke disks 30. The axial arms 42 of the magnetic yoke claws 40 are arranged annularly around the coil 24. Each of the magnetic yoke claws 40 further includes a hook end 43 extending axially from the other end of the radial arm 41 into the mounting groove 214 of the corresponding flange plate 21 through a respective indentation 33 so as to abut against the groove bottom wall 211 and the groove surrounding wall 213 of the mounting groove 214 in the corresponding flange plate 21. The hook end 43 is further sandwiched between two adjacent ones of the inner radial parts 321 of the radial protrusions 32 of a corresponding magnetic yoke disk 30.

The casing 50 is mounted rotatably to the hub shaft 10, and covers the bobbin 20, the magnetic yoke disks 30, and the magnetic yoke claws 40.

The magnet unit 60 includes a plurality of angularly spaced-apart magnets 61 provided on an inner wall of the casing 50 and facing the magnetic yoke claws 40.

Each of the insulating plate sets 70 includes a plurality of insulating plates 71 sleeved respectively on the hub shaft 10. One of the insulating plate sets 70 is clamped between the bobbin 20 and the retaining ring 12. The other one of the insulating plate sets 70 is clamped between the bobbin 20 and the screw nut 13. The insulating plate sets 70, aside from providing stability to the structure, also prevent leaking of magnetic flux from two ends of the hub shaft 10.

Since the outer peripheral faces 216 of the flange plates 21 of the bobbin 20 are not uneven in structure, a winding operation of the coil 24 can be performed smoothly without obstruction. Further, since the bobbin 20 is made of a magnetically conductive metal and not plastic, it has high structural strength. Additionally, during preparation for manufacture of the power-generating wheel hub 100, the magnetic yoke disks 30 can be preformed so that the number of indentations 33 suits a power requirement. Hence, there is no need to modify the structure of the bobbin 20, and it is necessary only to select suitable magnetic yoke disks 30 to obtain the desired number of magnetic poles. As a result, flexibility is provided with respect to changing structure of and making of the power-generating wheel hub 100.

Figure 3:
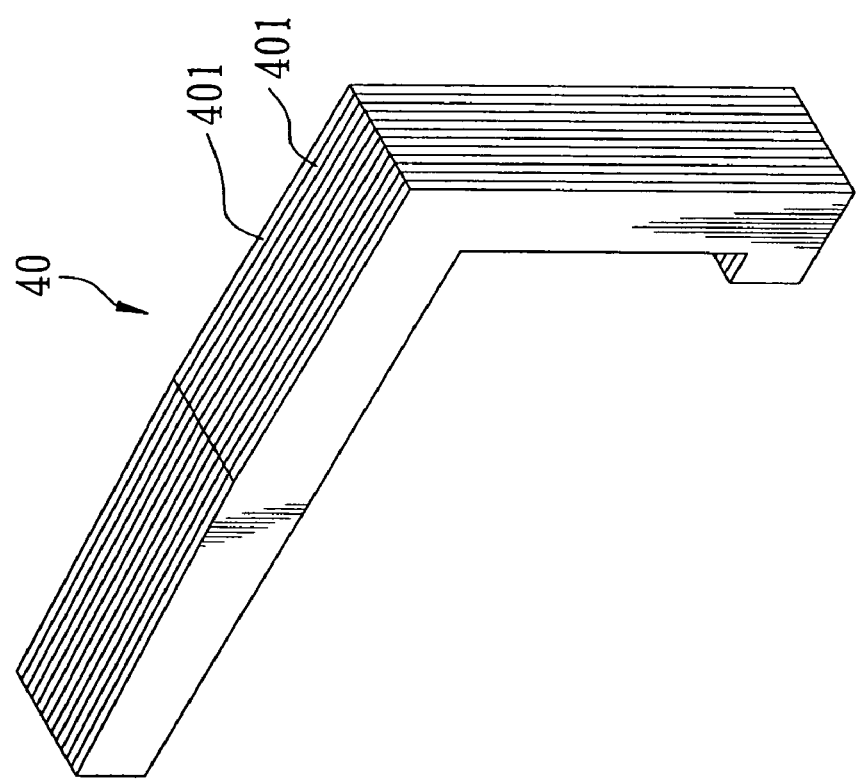
FIG. 3 is a perspective view of a magnetic yoke claw of a power-generating wheel hub according to the second preferred embodiment of this invention.

Referring to FIG. 3, a power-generating wheel hub 100 according to the second preferred embodiment of the present invention is similar to the first preferred embodiment. However, in this embodiment, each magnetic yoke claw 40 is formed from a laminate of magnetic sheets 401.

Figure 4:
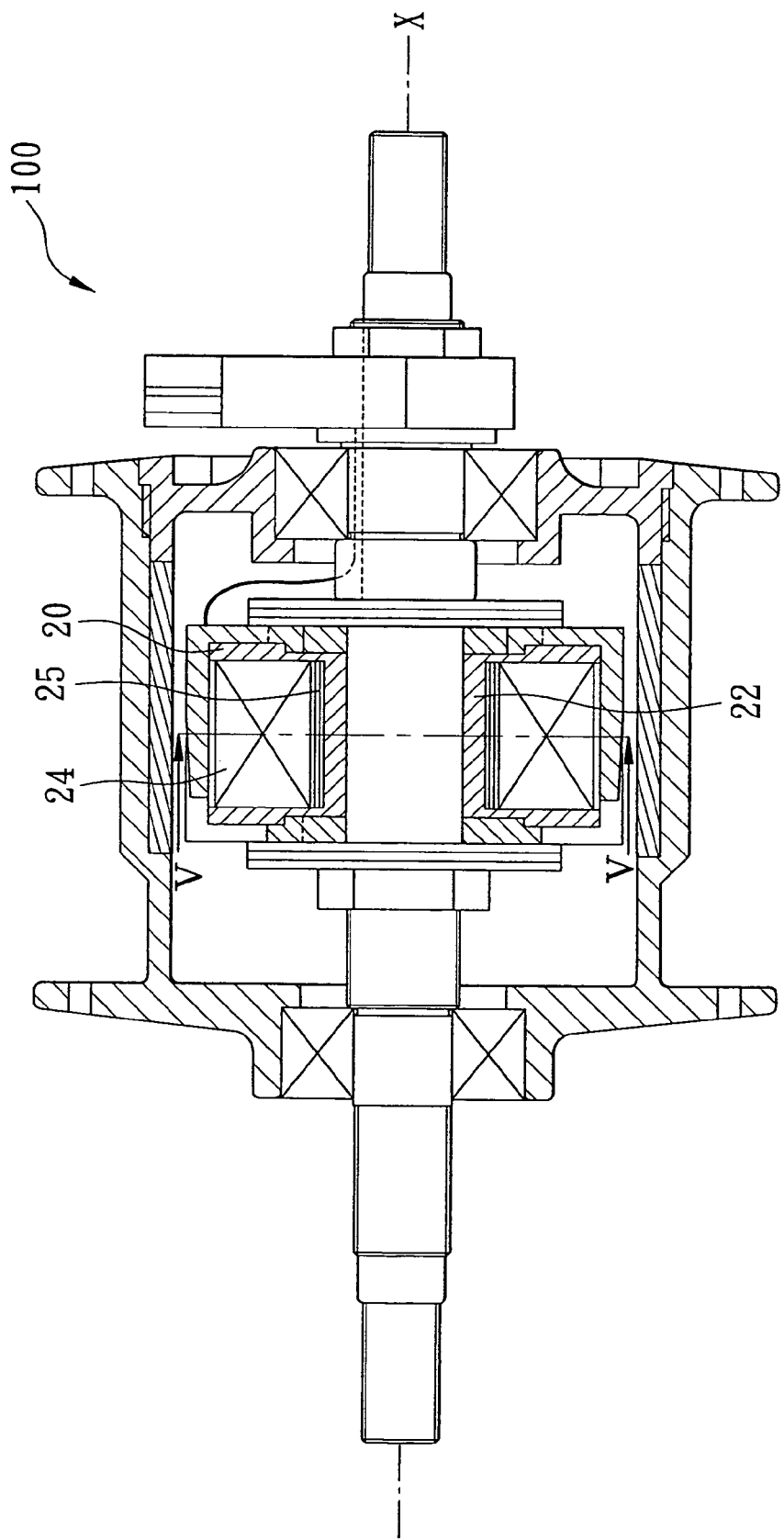
FIG. 4 is a sectional view of a power-generating wheel hub according to the third preferred embodiment of this invention.
Figure 5:
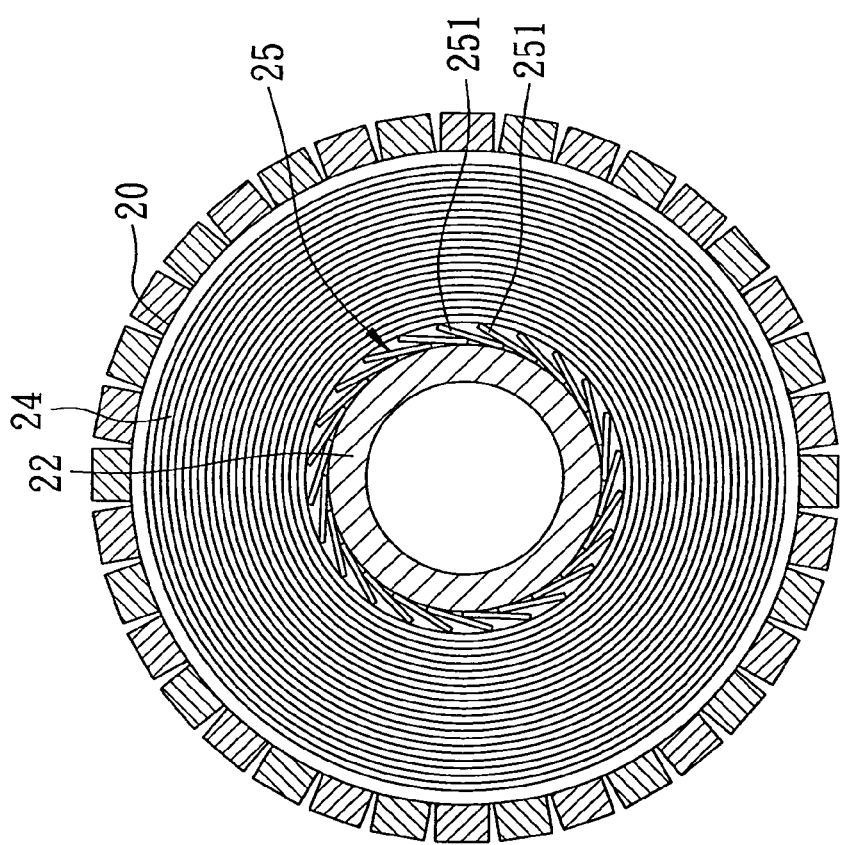
FIG. 5 is a sectional view of the third preferred embodiment taken along line V-V of FIG. 4.

Referring to FIGS. 4 and 5, a power-generating wheel hub 100 according to the third preferred embodiment of the present invention is similar to the first preferred embodiment. However, in this embodiment, the bobbin 20 further includes a magnetically conductive ring 25 surrounding the tubular body 22. The coil 24 is wound around the magnetically conductive ring 25. The magnetically conductive ring 25 includes a plurality of silicone steel plates 251. Each silicone steel plate 251 has a width equal to about an axial length of the tubular body 22. The silicone steel plates 251 overlap each other in an angular direction of the tubular body 22. Through the configuration of the magnetically conductive ring 25, a magnetic conduction effect can be increased, so that a power-generating effect of the power-generating wheel hub 100 can be enhanced.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

We claim:

1. A power-generating wheel hub, comprising:
   a hub shaft including a mounting section;
   a bobbin including a tubular body sleeved around said mounting section, two spaced-apart flange plates connected respectively to two opposite ends of said tubular body, and a coil wound around said tubular body between said flange plates, said bobbin being made of a magnetically conductive metal, each of said flange plates having an inner face confronting said coil, an outer face opposite to said inner face, and an outer peripheral face interconnecting said inner and outer faces, said outer peripheral face having a continuous circular shape;
   two magnetic yoke disks sleeved on said mounting section adjacent respectively to said outer faces of said flange plates, each of said magnetic yoke disks including a plurality of angularly spaced-apart radial protrusions, and a plurality of indentations each formed between two adjacent ones of said radial protrusions, said indentations in said two magnetic yoke disks being staggered axially with respect to each other;
   a plurality of magnetic yoke claws each including a radial arm abutting against said outer face of one of said flange plates, and an axial arm extending axially from said radial arm, said radial arms of said magnetic yoke claws being inserted respectively into said indentations in said magnetic yoke disks, said axial arms of said magnetic yoke claws being arranged annularly around said coil;
   a casing mounted rotatably to said hub shaft and covering said bobbin, said magnetic yoke disks, and said magnetic yoke claws; and
   a magnet unit including a plurality of angularly spaced-apart magnets provided on an inner wall of said casing and facing said magnetic yoke claws.

2. The power-generating wheel hub of claim 1, wherein said outer face of each of said flange plates is provided with a mounting groove defined by a groove bottom wall and an annular groove surrounding wall, said magnetic yoke disks being disposed respectively in said mounting grooves in said outer faces of said flange plates, each of said radial protrusions of each said magnetic yoke disk including an inner radial part extending into said mounting groove and abutting against said groove bottom wall and said groove surrounding wall, and an outer radial part that extends outwardly from said mounting groove, that abuts against said outer face of a corresponding one of said flange plates, and that is longer than said inner radial part.

3. The power-generating wheel hub of claim 2, wherein said radial arm of each of said magnetic yoke claws abuts against said outer face of the corresponding one of said flange plates outwardly of said mounting groove, said axial arm of each of said magnetic yoke claws abutting against said outer peripheral face of the corresponding one of said flange plates, each of said magnetic yoke claws further including a hook end extending axially from said radial arm into said mounting groove in the corresponding one of said flange plates through a respective said indentation to abut against said groove bottom wall and said groove surrounding wall of said mounting groove in the corresponding one of said flange plates.

4. The power-generating wheel hub of claim 3, wherein said bobbin further includes a magnetically conductive ring surrounding said tubular body, said coil being wound around said magnetically conductive ring.

5. The power-generating wheel hub of claim 4, wherein said magnetically conductive ring includes a plurality of silicone steel plates, each of said silicone steel plates having a width equal to about an axial length of said tubular body, said silicone steel plates overlapping each other in an angular direction of said tubular body.

6. The power-generating wheel hub of claim 1, further comprising a retaining ring sleeved on said hub shaft and disposed on one side of said bobbin, a nut sleeved on said hub shaft and disposed on the other side of said bobbin axially opposite to said retaining ring, and two insulating plate sets each set having a plurality of insulating plates sleeved on said hub shaft, one of said insulating plate sets being clamped between said retaining ring and said bobbin, the other one of said insulating plate sets being clamped between said nut and said bobbin.

7. The power-generating wheel hub of claim 1, wherein each said magnetic yoke claw is formed from a laminate of magnetic sheets.

\* \* \* \* \*